United States Patent [19]
Edele et al.

[11] 3,769,654
[45] Nov. 6, 1973

[54] DEVICE FOR FASTENING A WINDSHIELD WIPER ARM ON A DRIVE SHAFT

[75] Inventors: Reinhard Edele; Alfred Kohler, both of Bietigheim, Germany

[73] Assignee: SWF-Spezialfabrick fuer Autozubehoer Gustav Rau GmbH, Bietigheim, Germany

[22] Filed: Dec. 29, 1971

[21] Appl. No.: 213,468

[30] Foreign Application Priority Data
Feb. 9, 1971  Germany .................. G 71 04 759.1

[52] U.S. Cl. .......................................... 15/250.34
[51] Int. Cl. .......................................... B60s 1/34
[58] Field of Search ................... 15/250.31, 250.34, 15/250.35, 250.42; 287/53 UA

[56] References Cited
UNITED STATES PATENTS
2,860,364  11/1958  Krohm .............................. 15/250.34
2,860,365  11/1958  Krohm .............................. 15/250.34
3,429,597  2/1969  Krohm ........................ 15/250.34 X FOREIGN PATENTS OR APPLICATIONS
912,820  12/1962  Great Britain .................. 15/250.35

*Primary Examiner*—Peter Feldman
*Attorney*—Toren & McGeady

[57] ABSTRACT

In a device for attaching a windshield wiper arm to a drive shaft, a receiving member having a socket-shaped first section is fitted over the drive shaft and a cover member and a coupling member are pivotally attached on a common pivot axis to a second section of the receiving member which extends laterally from its first section. The coupling member extends from the second section away from the first section and is arranged to be secured to the wiper arm. The cover member can be pivoted between a closed position covering the first section in which the drive shaft is secured and an open position in which the drive shaft is accessible. The cover member and coupling member are positioned so that they can be pivoted relative to one another as well as relative to the receiving member.

4 Claims, 2 Drawing Figures

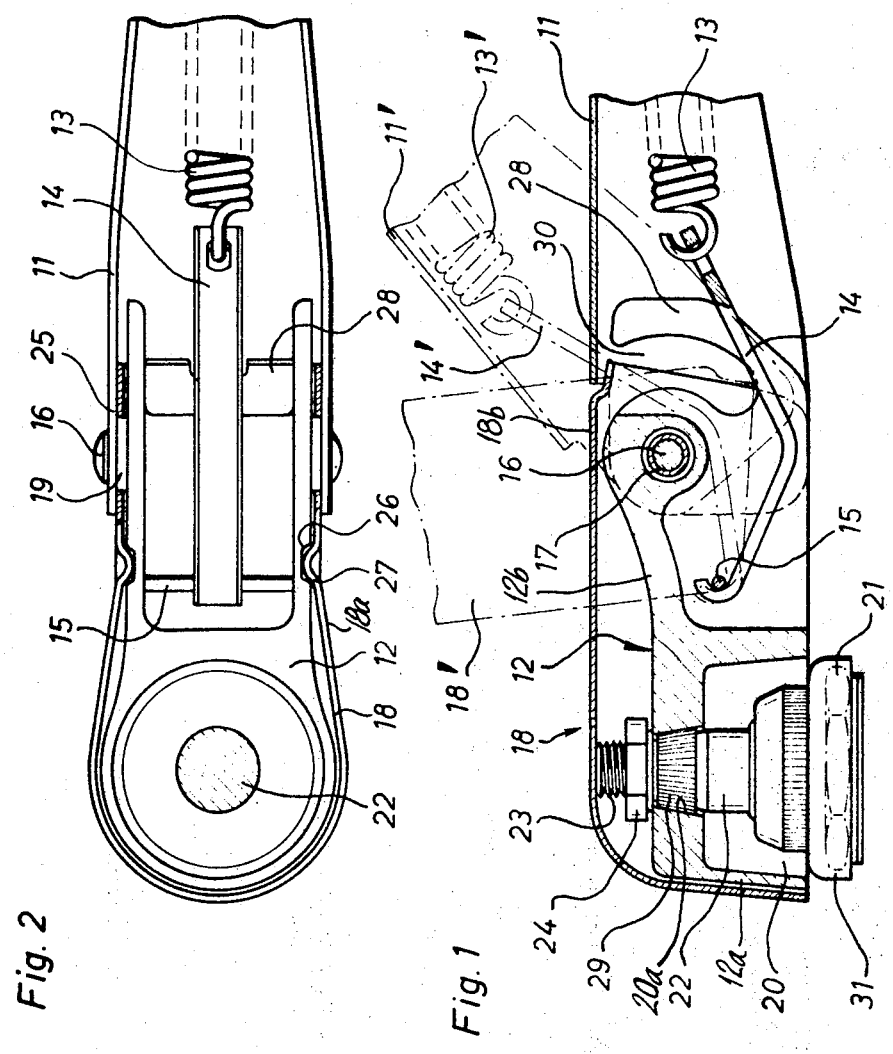

3,769,654

DEVICE FOR FASTENING A WINDSHIELD WIPER ARM ON A DRIVE SHAFT

SUMMARY OF THE INVENTION

The present invention is directed to a device for fastening a windshield wiper arm on a drive shaft, especially for use with motor vehicles, and, more particularly, it concerns a receiving member having a socket-type section in which the drive shaft is secured and another section extending laterally from the socket-type section to which a cover member and a coupling member for the wiper arm are articulated.

In known devices for securing a windshield wiper arm to a drive shaft, socket-type receiving parts are provided with a stop spring which extends around the shoulder provided on the drive shaft and connects the receiving part with the drive shaft by a stop connection. Such devices are disadvantageous because the stop element is not readily accessible for removing the wiper arm, because it is covered by the receiving part which has a cap-shaped configuration. Further, there is a limited retaining force which can be produced by means of the stop connection so that such devices are not suitable for use with large wiper arms.

Other devices are also known for fastening a wiper arm on a drive shaft which use a socket-receiving part that is non-rotatably attached on a stop cone provided on the end of the shaft and is locked to the drive shaft by means of a nut. The drive shaft, the receiving part and the nut are covered by a cap member so that the axial bearing for the shaft is protected against the leakage of any liquid. Such a cap member can be attached on the receiving part, as shown in British Pat. No. 756,229, so that the elastic walls of the cap member deflect inwardly and the cap can be hinged down onto the wiper arm. However, this attachment of the cover member or cap on the receiving member is not sufficient in continued use, since the cap becomes accidentally detached with the aging of its material.

Therefore, it is the object of the present invention to provide an improved device for fastening a windshield wiper arm on a drive shaft similar to the above-mentioned type in which the cap is formed of a hard material and can be securely attached onto the receiving member without any further expenditure for additional fastening means. This object is achieved by articulating a coupling member which attaches the wiper arm to the receiving part and a cover member onto a common pivot axis in the receiving member at a position spaced from the axis of the drive shaft. In such an arrangement the cover member is securely attached to the receiving member and the fastening means for articulating the coupling part of the wiper arm to the receiving member are also used for the articulation of the cover member. Preferably, the cover member and the coupling member are pivoted to the receiving member at a location spaced from the drive shaft in the direction of the windshield wiper arm so that they can be pivotally displaced relative to and independent of one another as far as is possible.

For articulating the cover member and the coupling member to the receiving member, in one embodiment a bore extends through the receiving member in alignment with openings through the cover member and the coupling member so that a bearing pin within a bearing bush positioned within the bore and openings affords the desired hinged connection. In such an arrangement the side walls of the cover member are positioned between the sides of the receiving member and the side walls of the coupling member with distance washers mounted on the hinge pin in the range of the side walls of the cover member for pivotally mounting the cover member relative to the receiving member and the coupling member.

The cover member is pivotally displaceable between a closed position covering the location of the drive shaft through the receiving member and an open position in which the drive shaft is accessible. In the closed position the cover member is secured onto the receiving member by means of corresponding stop elements positioned on each of the members which lock the cover member in the closed position.

At the location of the end of the cover member adjacent the coupling member for the wiper arm, the end of the cover member is bent downwardly below the juxtaposed edge of the coupling member so that it is covered by the end of the cover member and can effect its pivoting action without any interference.

Another feature of the invention involves the manner in which a pressure spring is secured at one end to the wiper arm and at the other end to a yoke pivotally secured to the receiving member. The receiving member has spaced guide elements for guiding the pivotal movement of the yoke and these guide elements are provided with recesses so that the cover member can be pivoted about the end of the receiving member between the closed and opened positions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is a side view, partly in section, of a device for attaching a windshield wiper arm to a drive shaft in accordance with the present invention; and FIG. 2 is a bottom view of the arrangement shown in FIG. 1.

DETAILED DESCRIPTION OF THE INVENTION

In FIG. 1 a receiving member 12 has a first section 12a and a second section 12b extending laterally from the first section. The first section 12a is shaped into a socket-like configuration 20 with a frusto-conical opening extending through the first section in communication with its socket. The second section 12b of the receiving member 12 extends outwardly from the first section 12a in the direction toward the wiper arm, which is not illustrated. For connecting the wiper arm to the receiving member, a coupling member 11 is provided secured at one end, not shown, to the wiper arm and articulated at its other end to the second section 12b. A pressure spring 13 is secured at one end, not shown, to the wiper arm and at its other end adjacent the receiving member to a yoke 14 which is pivotally mounted at a position spaced from the spring on a pin 15 secured to the second section of the receiving member. The pin 15 is located within a recess in the receiving member so that the yoke can be pivoted upwardly as shown in FIG. 1 when the coupling member-wiper arm move from the position shown in solid lines to the position shown in phantom where the coupling member is identified as 11' and the spring and yoke are identified as 13' and 14', respectively. When the yoke 14 is pivoted upwardly a stop action is provided by its contact with the portion of the second section to which the coupling member is articulated.

Adjacent the end of the second section 12b spaced outwardly from the first section 12a of the receiving member 12, the cover member 18 has side walls 18a and the coupling member also has side walls 25 which are located outwardly from the sides of the second section. The articulated connection between the second section and the cover member and coupling member is provided by a hinge pin 16 positioned within a bearing bush 17 which, in turn, is fitted within a bore which extends through the second section transversely of the axis of the opening 20a in the first section. Aligned openings are provided in the side walls 18a, 25 of the cover member and coupling member, respectively, through which the hinge pin 16 extends. As indicated in FIG. 2, the ends of the hinge pin are riveted onto the outwardly facing surfaces of the side walls 25 of the coupling member so that the pin is locked in position in the pivot joint. Further, as also shown in FIG. 2, distance washers 19 are fitted onto the hinge pin 16 in the range of its passage through the side walls 18a of the cover member, located between the sides of the receiving member and the side walls 25a of the coupling member, for affording the pivotal attachment of the cover member 18 relative to the receiving member 12 and the coupling member 11. With this arrangement it is possible for the cover member 18 to be pivoted independently of the wiper arm. In its pivotal movement the cover member 18 can be displaced from its closed position shown in full lines in FIG. 1 to its open position shown in phantom and identified by the reference numeral 18' in which position the cover member is swung clear of the drive shaft and the first section of the receiving member so that the drive shaft becomes accessible.

In FIG. 1 the structure of the drive shaft 22 is shown which includes a lock nut 21 for securing the bearing bush of the wiper bearing in the body of a motor vehicle. A cap 31 is provided over the lock nut 21 from which the drive shaft 22 projects into the socket part 20 formed by the first section 12a of the receiving member. In the range of the opening 20a in the first section, the drive shaft has a similarly configured frusto-conical section 29 with an externally toothed or grooved surface which engages the surface in the opening so that the receiving member is secured onto the drive shaft in a non-rotatable manner. At the upper end of the drive shaft a threaded portion 23 is provided onto which a lock nut 24 is secured for firmly attaching the receiving member onto the drive shaft.

To permit the yoke 14 and the spring 13 to pivot into the position shown in phantom, the second section 12b of the receiving member 12 is subdivided into two guide elements 28 which direct the yoke 14 along the center axis of the coupling member 11 and the receiving member 12.

To permit the cover member 18 to be pivoted without any interference relative to the coupling member 11, the end of the top wall 18b of the cover member located above the pivot axis formed by the hinge pin 16 is bent downwardly toward the pivot axis, note FIG. 1, and is partly covered by the adjacent end of the coupling member 11. Further, recesses 30 are provided in the guide elements 28 so that the end of the top wall 18b of the cover member can be pivoted downwardly, such as shown in phantom in FIG. 1, when the cover member is moved into its open position.

To provide a locking action between the cover member 18 and the receiving member 12, the side walls 18a of the cover member are indented inwardly providing the stop surfaces 27. Correspondingly, the juxtaposed surfaces of the sides of the receiving member are provided with recesses 26 into which the stop surfaces 27 seat for releasably holding the cover member 18 in its closed position on the receiving member 12.

While a specific embodiment of the invention has been shown and described in detail to illustrate the application of the inventive principles, it will be understood that the invention may be embodied otherwise without departing from such principles.

What is claimed is:

1. A device for mounting a windshield wiper arm, particularly for use on motor vehicles, on a drive shaft, comprising a receiving member having a first section forming a socket therein arranged to fit over the drive shaft, said first section having an opening therethrough communicating with the socket and arranged to engage the drive shaft securely therein, and a cover member arranged to fit over said receiving member, said receiving member including a second section extending laterally from said first section transversely of the axis of the opening in said first section, a coupling member securing the wiper arm to said receiving member shaft means having an axis about which said cover member and said coupling member are pivoted, said second section having a bore extending therethrough between its side surfaces transversely of the axis of the opening in said first section, said shaft means being disposed in the bore in said second section and extending laterally outwardly from said second section, said cover member and said coupling member having side walls positioned outwardly from the sides of said second section and said side walls of said cover member and coupling member having openings aligned with the bore through said second section for receiving said shaft means, said side walls of said cover member being rotatably mounted between said second section of said receiving member and said side walls of said coupling member, and washer means interposed between said shaft means and said openings in said cover member whereby said cover member is rotatable on said washer means and the latter is rotatable on said shaft means.

2. A device as set forth in claim 1 wherein said receiving member and said cover member are provided with cooperable stop means for detachably locking said cover member in a closed position.

3. A device as set forth in claim 1, wherein said cover member is pivotal between a closed position covering the opening in said first section of said receiving member and an open position affording access to the opening in said first section, the end of said cover member above said second section being bent downwardly toward the pivot axis in said second section, said coupling member terminating above the downwardly bent end of said cover member at a position spaced outwardly from the pivot axis in said second section on the opposite side thereof from said first section.

4. A device, as set forth in claim 3, wherein a pin is secured to said second section between said first section and the bore in said second section, a yoke rotatably secured on said pin and extending outwardly away from said first section, a spring secured to the end of said yoke spaced from said spring, and the opposite end of said spring arranged to be secured to the wiper arm, said second section forming guide elements for directing said yoke as it pivots with said coupling member and the wiper arm, and said guide elements forming recesses for receiving the downwardly bent end of said cover member as it moves from a closed position covering the said first section of said receiving member to an open position affording access to the opening in said first section with the downwardly bend end moving toward said second section of said receiving member.

* * * * *